(12) United States Patent
Kuo

(10) Patent No.: US 6,338,587 B1
(45) Date of Patent: Jan. 15, 2002

(54) MODIFIED LOCKING STRUCTURE OF RETRACTABLE DRAW BAR

(75) Inventor: Chung-Hsien Kuo, Taipei Hsien (TW)

(73) Assignee: Chaw Khong Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 09/577,973

(22) Filed: May 25, 2000

(30) Foreign Application Priority Data

Apr. 21, 2000 (TW) .................................. 89206586 U

(51) Int. Cl.[7] .............................. F16B 7/10; A45C 3/00
(52) U.S. Cl. .................... 403/109.7; 16/113.1; 190/115
(58) Field of Search ........................... 403/109.3, 109.6, 403/109.7, 109.5, 109.2, 378, 322.3, 322.1; 16/113.1, 405; 190/115; 280/655, 655.1, 47.315

(56) References Cited

U.S. PATENT DOCUMENTS

| | | | | |
|---|---|---|---|---|
| 5,458,020 A | * | 10/1995 | Wang | 403/109.7 X |
| 5,488,756 A | * | 2/1996 | Hsieh | 16/113.1 |
| 5,806,143 A | * | 9/1998 | Tsai | 16/405 |
| 5,862,572 A | * | 1/1999 | Lin et al. | 16/405 |
| 5,911,263 A | * | 6/1999 | Wu | 16/429 |
| 6,134,749 A | * | 10/2000 | Kuo | 16/113.1 |
| 6,141,828 A | * | 11/2000 | Kuo | 16/113.1 |
| 6,161,253 A | * | 12/2000 | Tu | 16/113.1 |
| 6,223,391 B1 | * | 5/2001 | Kuo | 16/113.1 |

* cited by examiner

Primary Examiner—Harry C. Kim
(74) Attorney, Agent, or Firm—Rosenberg, Klein & Lee

(57) ABSTRACT

The present invention proposes a modified locking structure of a retractable draw bar. The proposed modified locking structure comprises a fixed assembly, a movable assembly, and a click button. The movable assembly has a longitudinally long guide hole to let a guide block and a pin bar of the fixed assembly penetrate through transversely. The movable assembly can thus be joined with the fixed assembly at the bottom opening of the first joint tube and can steadily move upwards or downwards with respect to the fixed assembly. The click button matched to a resilient element is allocated in a transverse allocation tank of the fixed assembly and protrudes in the long guide hole to be secured in a click hole of a second joint tube timely. A wedged guide groove and a wedged guide block both having an upper bevel and a lower bevel are installed at corresponding positions of the movable assembly and the click button, respectively. No matter a soft steel cord is used to pull the movable assembly upwards or a hard steel rod is used to press the movable assembly downwards, the click button can be pushed sideward and retracted transversely from the click hole. Smoother protraction/retraction and steadier positioning of the draw bar can thus be achieved. Moreover, easier assembly of the retractable draw bar can be achieved.

11 Claims, 7 Drawing Sheets

MODIFIED LOCKING STRUCTURE OF RETRACTABLE DRAW BAR

FIELD OF THE INVENTION

The present invention relates to a modified locking structure and, more particularly, to a modified locking structure installed in a retractable draw bar of a travelling case to facilitate the protraction/retraction and the positioning of the retractable draw bar. The retractable draw bar can be pulled upwards or pressed downwards so as to achieve smooth operation. Moreover, convenient assembly of the retractable draw bar can be achieved.

BACKGROUND OF THE INVENTION

For a travelling case with rollers installed at the bottom thereof, there is a retractable draw bar allocated to facilitate the protraction/retraction of a draw handle so that the draw handle can be gripped conveniently when used and occupies no space when not used. Moreover, to let the retractable draw bar be positioned at a proper position when protracted, there is a locking structure installed between a first joint tube and a second joint tube to control the retractile state of each joint tube.

With the retractable draw bar of a commercial travelling case as an example, the locking structure installed at a first joint tube has a first positioning element. A first positioning part is installed in the first positioning element to be pushed by a transverse spring so as to be secured in a click hole of a second joint tube and joined with an L-shaped plate. The L-shaped plate is drawn by a cord connected to the push mechanism of a draw handle so that the L-shaped plate can be pulled upwards via the cord to let the first positioning part be retracted into the click hole. The first joint tube can thus be pushed into the second joint tube. The first positioning part is retracted by the leverage generated by the L-shaped plate. Because the path of lever motion is circular but not rectilinear, the transverse locomotion of the first positioning part is not smooth so that obstruction will easily arise. Moreover, the L-shaped plate can only apply to upward-pull type retractable draw bars and can not apply to downward-push type retractable draw bars.

With the retractable draw bar of another commercial travelling case as another example, the locking structure of a first joint tube has a tube seat. A transverse allocation hole with a bead allocated therein is installed in the tube seat. A movable plate pushed upwards by a spring is longitudinally inserted in the tube seat. The top of the movable plate is drawn by a cord. The bottom of the movable plate has a circular slide part facing the bead. When the first joint tube is pulled out, the bead will be pushed by the slide part to be secured in a click hole of a second joint tube. When the cord is pulled upwards to pull the movable plate upwards, the bead will be freed and pressed by the first joint tube so that the bead will leave the click hole. However, when the movable plate is pulled upwards by the cord, there is no spring or other force to push the bead. The bead is only freed and rolls off. Therefore, it is not certain whether the bead will leave the click hole. It is possible that the bead is still jammed in the click hole so that the protraction/retraction of the draw bar will be blocked. Furthermore, the draw bar will not be steadily positioned when pulled upwards. Similar to the above example, the L-shaped plate can only apply to upward-pull type retractable draw bars and can not apply to downward-push type retractable draw bars.

SUMMARY AND OBJECTS OF THE PRESENT INVENTION

One object of the present invention is to provide a modified locking structure of a retractable draw bar, which not only applies to upward-pull type retractable draw bars, but also applies to downward-press type retractable draw bars. Moreover, the locking state of the retractable draw bar can be released timely.

Another object of the present invention is to provide a modified locking structure of a retractable draw bar, which can facilitate the protraction/retraction of the retractable draw bar and can steadily position the retractable draw bar when the retractable draw bar is pulled to a predetermined position.

To achieve the above objects, a locking mechanism comprising a fixed assembly, a movable assembly, and a click button is installed at the bottom opening of a first joint tube. The movable assembly has a longitudinally long guide hole to let a guide block and a pin bar of the fixed assembly penetrate through transversely so that the movable assembly can steadily move upwards or downwards with respect to the fixed assembly. The click button matched to a resilient element is allocated in a transverse allocation tank of the fixed assembly and protrudes in the long guide hole to be secured in a click hole of a second joint tube timely. A wedged guide groove and a wedged guide block both having an upper bevel and a lower bevel are installed at corresponding positions of the movable assembly and the click button, respectively. When the movable assembly is pulled upwards or pressed downwards, the click button can thus be pushed sideward and retracted transversely from the click hole.

The various objects and advantages of the present invention will be more readily understood from the following detailed description when read in conjunction with the appended drawings, in which:

DETAILED DESCRIPTION OF PREFERRED EMBODIMENT

Figure 1:
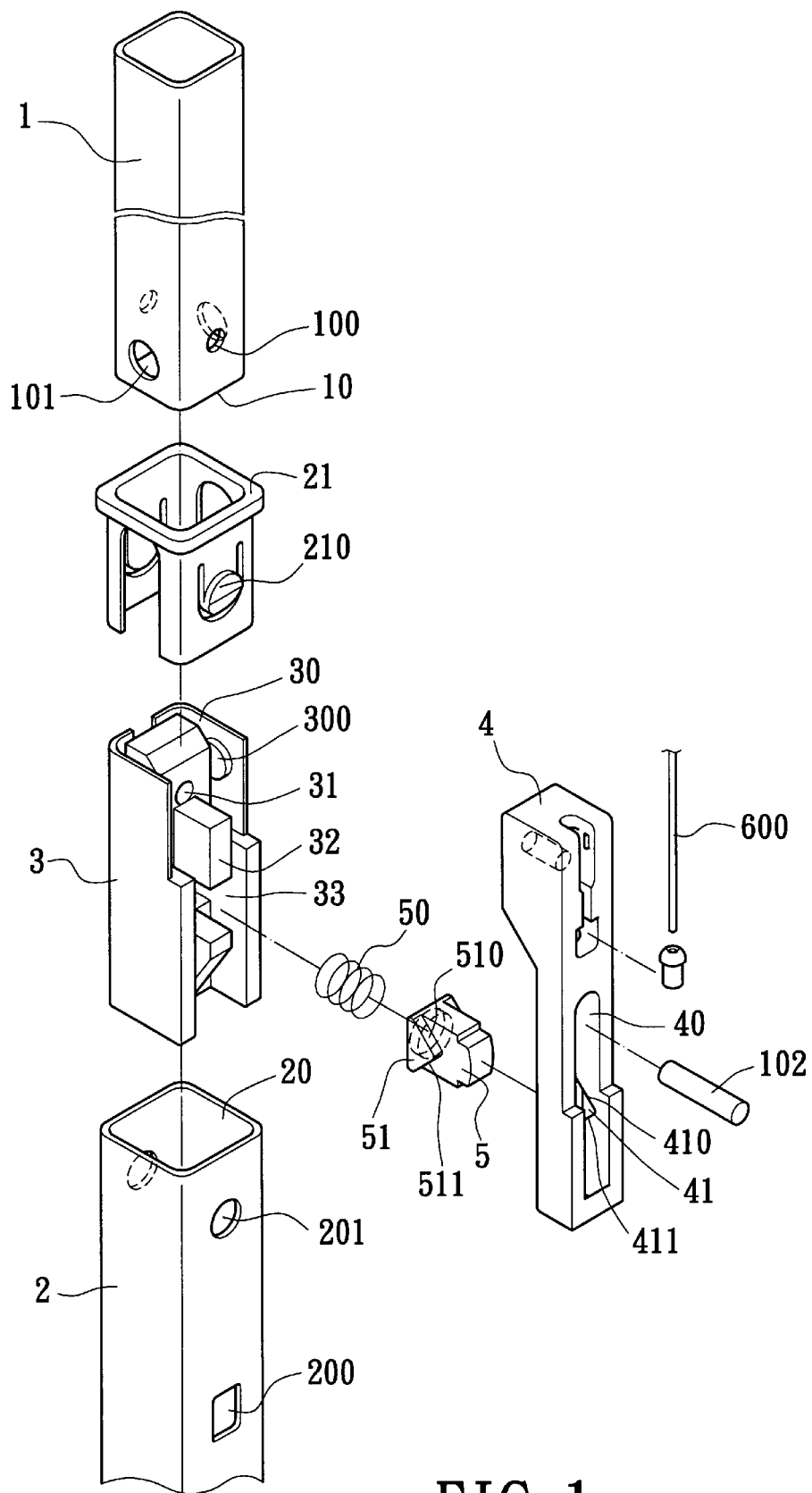
FIG. 1 is an exploded perspective view according to a first embodiment of the present invention.

As shown in FIG. 1, a modified locking structure of a retractable draw bar according to a preferred embodiment of the present invention comprises a first joint tube 1, a second joint tube 2, a fixed assembly 3, a movable assembly 4, and a click button 5.

Figure 3:
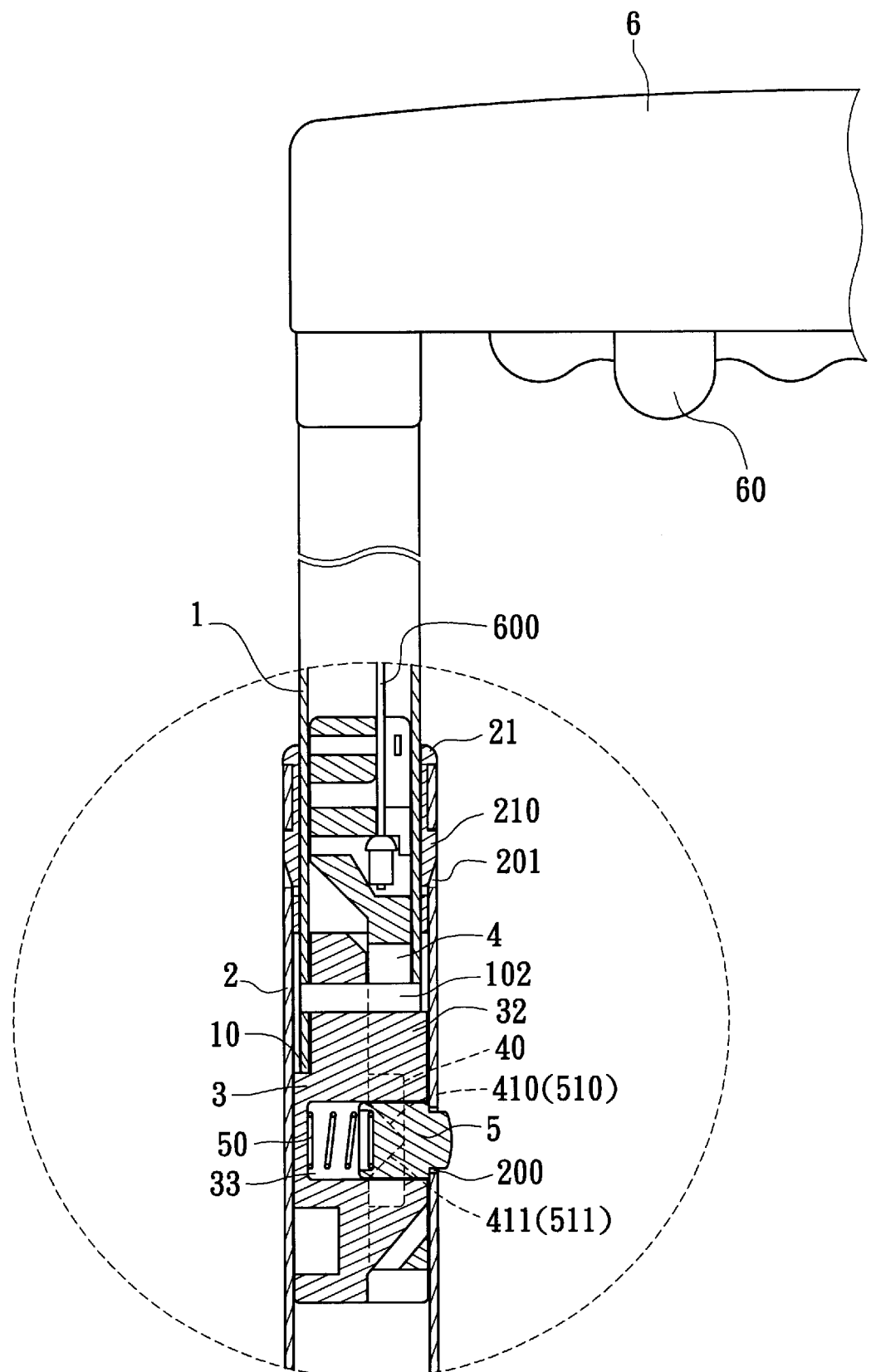
FIG. 3 is an axially cross-sectional view when the first joint tube is pulled upwards with respect to the second joint tube and is secured and positioned via the click button according to a first embodiment of the present invention.

The first joint tube 1 is fixedly joined with a draw handle 6 having a push mechanism 60, as shown in FIG. 3. The push mechanism 60 is connected to a working element protruding in the first joint tube 1. The working element is a soft steel cord 600 in this embodiment. When a user press the push mechanism 60, the steel cord 600 can be pulled upwards. Through holes 100 and positioning holes 101 are disposed on each of the two opposite tube walls near the bottom opening 10 of the first joint tube 1, respectively.

The diameter of the second joint tube 2 is slightly larger than that of the first joint tube 1 so that the first joint tube 1 can be retractably inserted in the second joint tube 2. Click holes 200 and buckling holes 201 are disposed on the tube walls near the top opening 20 of the second joint tube 2. A tube bushing 21 is inserted in the top opening 20. A resilient buckling button 210 is formed on each side of the tube bushing 21 to be secured in the buckling hole 201 so that the tube bushing 21 can be joined at the top opening 20.

An annular groove 30 of a comparable diameter with that of the first joint tube 1 is formed at the top of the fixed assembly 3. A projecting fastener 300 is formed on each of the two opposite groove walls so that the first joint tube 1 can be inserted in the annular groove 30. The fixed assembly 3 can be joined at the bottom opening 10 of the first joint tube 1 through the fastening of the projecting fastener 300 in the positioning hole 101. The width of the fixed assembly 3 is comparable with the diameter of the second joint tube 2. When the first joint tube 1 is inserted in the second joint tube 2, the fixed assembly 3 will be situated below the tube bushing 21 so that the first joint tube 1 will be blocked by the tube bushing 21 even when pulled upwards to the highest position. Additionally, a transversely extending penetrated hole 31, a guide block 32 having a proper longitudinal height, and an allocation tank 33 corresponding to the click hole 200 are installed on the fixed assembly 3.

The top of the movable assembly 4 is connected to the steel cord 600. A long guide hole 40 extending a proper length longitudinally is disposed in the movable assembly 4. A wedged groove 41 having an upper bevel 410 and a lower bevel 411 is formed on each of the two side walls of the long guide hole 4 adjacent to the fixed assembly 3. The movable assembly 4 sticks to one side of the fixed assembly 3 so that the guide block 32 protrudes in the long guide hole 40. A pin bar 102 is used to penetrate through the long guide hole 40, the penetrated hole 31 of the fixed assembly 3, and the through hole 100 of the first joint tube 1. Therefore, the movable assembly 4 can be joined with the fixed assembly 3 and can steadily move upwards or downwards with respect to the fixed assembly through the help of the slide mechanism of the long guide hole 40 and the guide block 32. Moreover, the fixed assembly 3 and the movable assembly 4 are joined at the bottom opening 10 of the first joint tube 1.

The click button 5 matched to a resilient element 50 is allocated in the allocation tank 33 of the fixed assembly 3 so that the click button 5 can be pressed to protrude in the long guide hole 40 of the movable assembly 4. The click button 5 can thus be secured in the click hole 200 of the second joint tube 2 timely. A wedged guide block 51 having an upper bevel 510 and a lower bevel 511 is formed on each of the two sides of the click button 5 and is secured in the wedged guide groove 41 of the movable assembly 4.

Figure 2:
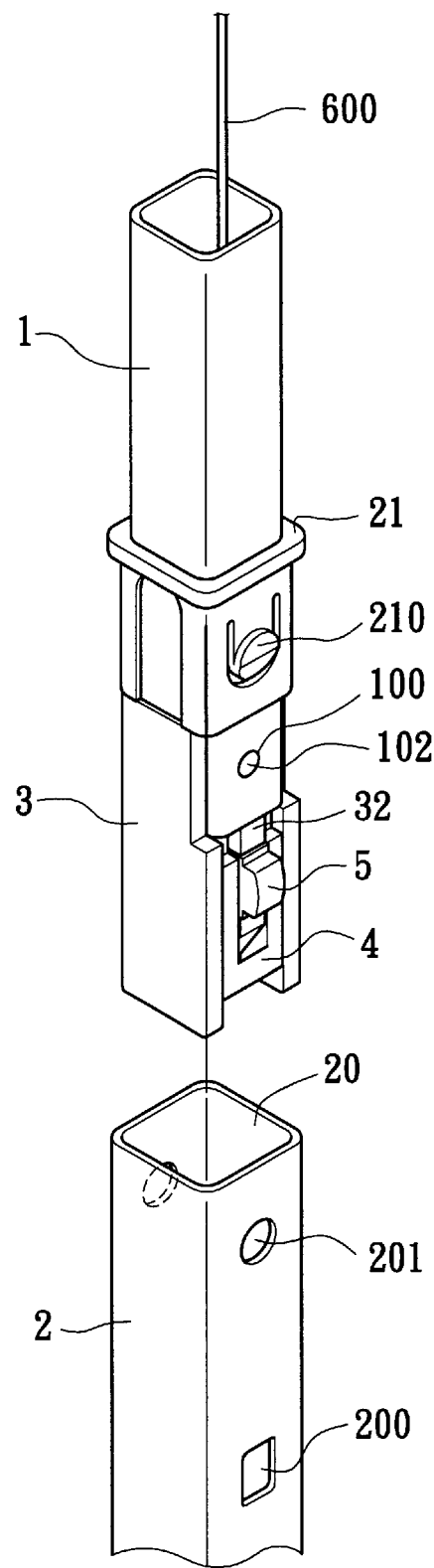
FIG. 2 is a perspective view according to a first embodiment of the present invention.

When the locking structure is to be assembled, the fixed assembly 3 and the movable assembly 4 with the click button 5 placed in between are installed at the bottom of the first joint tube 1, as shown in FIG. 2. Next, the tube bushing 21 is sheathed on the first joint tube 1. The first joint tube 1 is then inserted in the second joint tube 2. Through the fastening of the tube bushing 21 on the top opening 20, the first joint tube 1 and the second joint tube 2 can be easily joined. Progressive and systematic production process can thus be achieved so that manpower and time will not be wasted. Moreover, because the locking mechanism comprising the fixed assembly 3, the movable assembly 4, and the click button 5 can be preinstalled on the first joint tube 1, the first joint tube 1 and the second joint tube 2 can be produced, assembled, stored, and transported separately. Production efficiency can thus be greatly enhanced.

Figure 4:
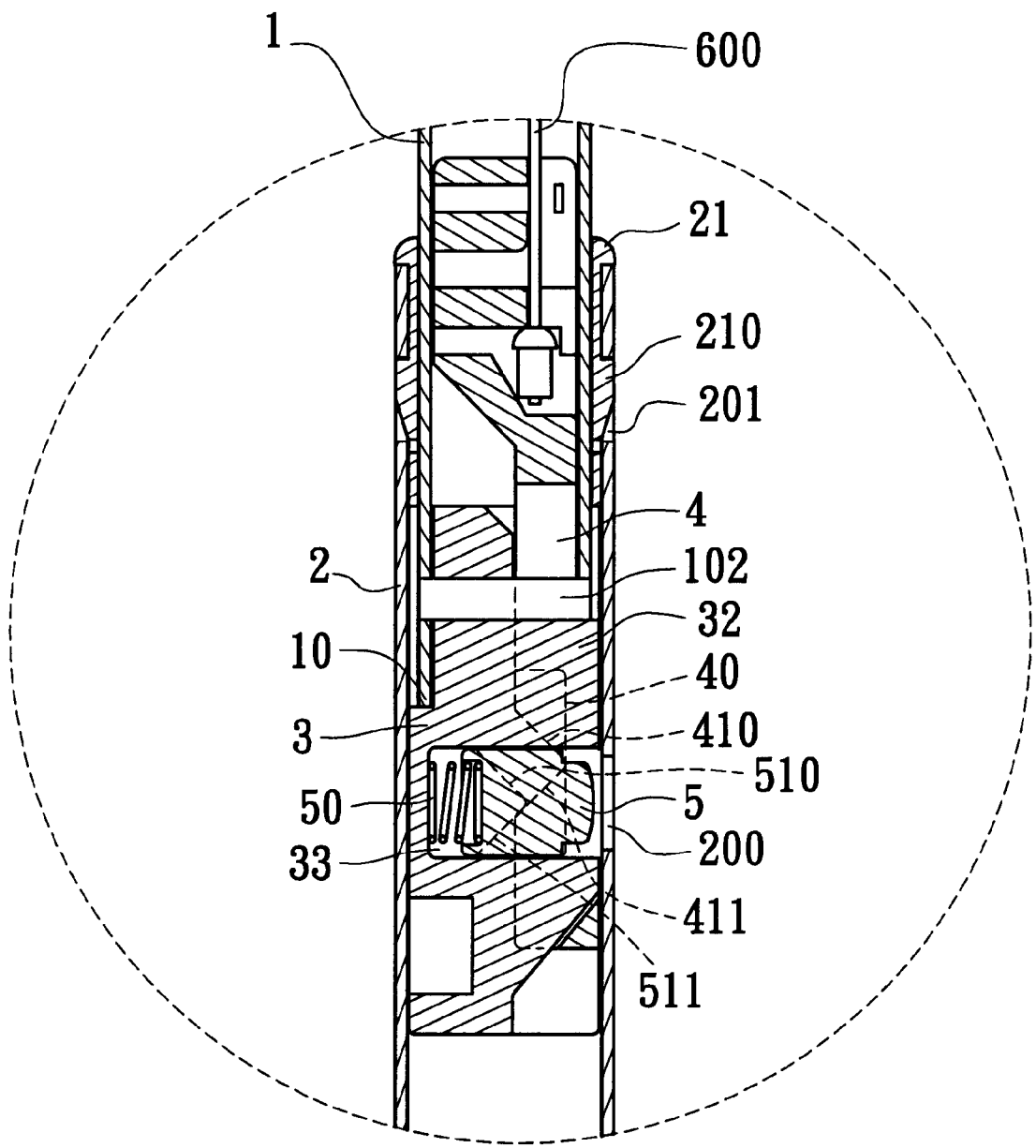
FIG. 4 is an axially cross-sectional view when the click button is retracted so that the first joint tube can move with respect to the second joint tube according to a first embodiment of the present invention.
Figure 5:
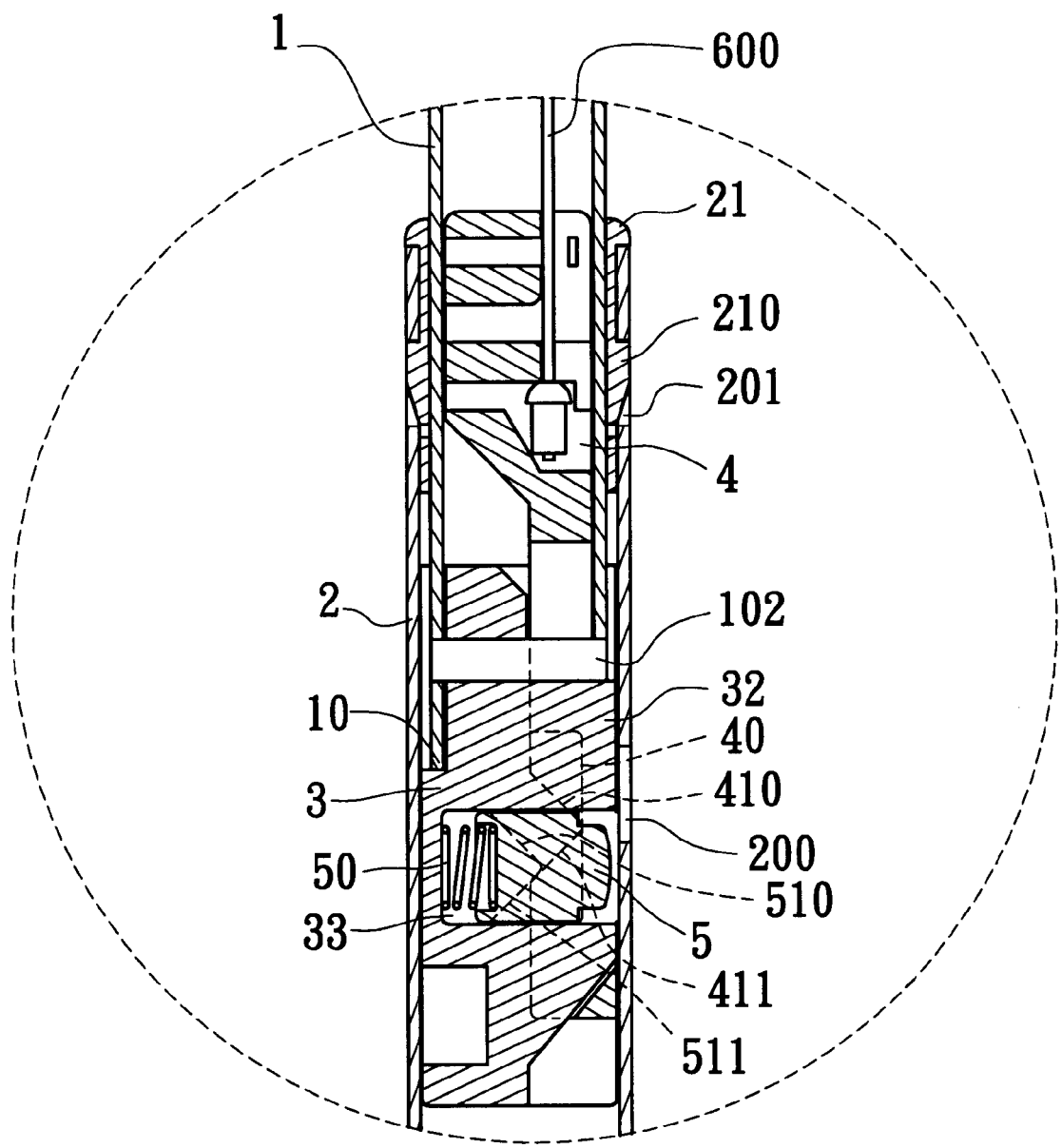
FIG. 5 is an axially cross-sectional view when the click button is retracted so that the first joint tube is pushed in the second joint tube according to a first embodiment of the present invention.

As shown in FIGS. 3 to 5, when a user pulls the draw handle 6, the first joint tube 1 will be pulled upwards with respect to the second joint tube 2 till the fixed assembly 3 sticks to the tube bushing 21. At this time, the wedged guide block 51 of the click button 5 is locked with the wedged guide groove 41 so that the resilient element 50 will push the click button 5 to protrude out from the click hole 200. The first joint tube 1 can thus be steadily positioned with respect to the second joint tube 2. When the push mechanism 60 is pressed to push the first joint tube 1 back, the steel cord 600 will pull the movable assembly 4 upwards so that the lower bevel 411 of the movable assembly 4 will smoothly push sideward the lower bevel 511 of the click button 5. The click button 5 will be retracted transversely and leave from the click hole 200. The first joint tube 1 can thus be pushed downwards and inserted in the second joint tube 2. Therefore, the protraction/retraction of the retractable draw bar is very steady and smooth.

Figure 6:
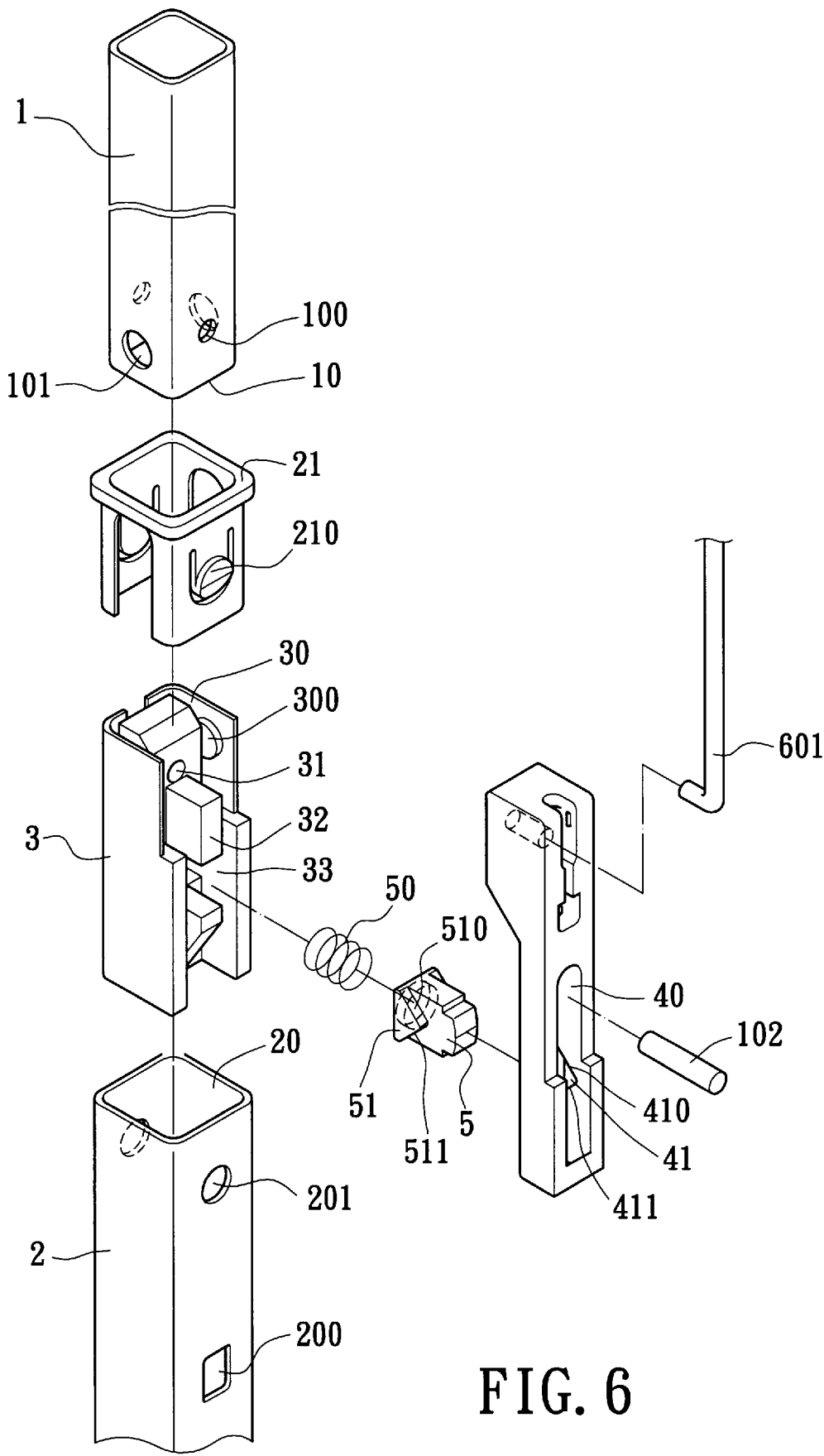
FIG. 6 is an exploded perspective view according to a second embodiment of the present invention.
Figure 7:
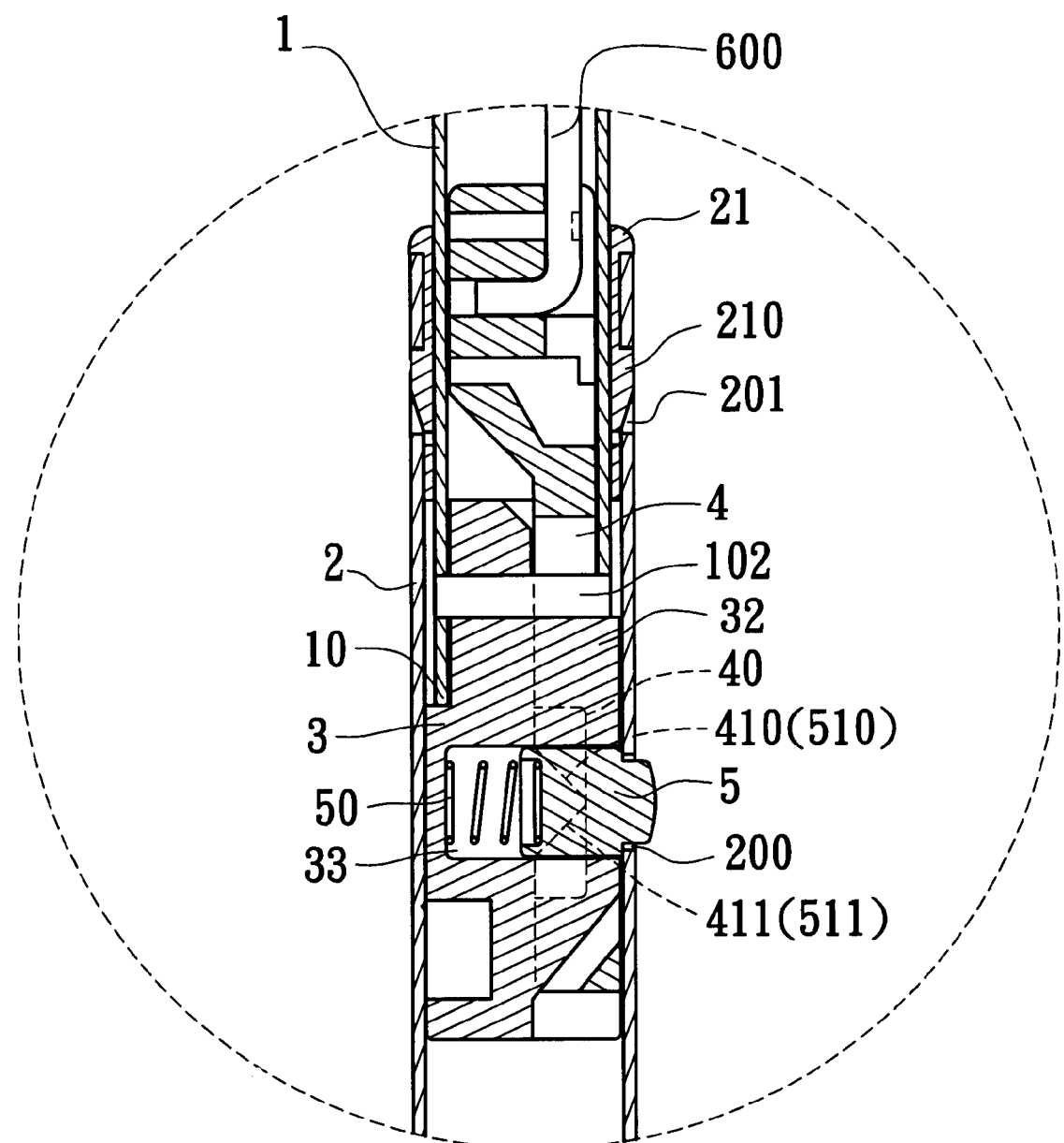
FIG. 7 is an axially cross-sectional view when the first joint tube is pulled upwards with respect to the second joint tube and is secured and positioned via the click button according to a second embodiment of the present invention.

As shown in FIGS. 6 and 7, a hard steel rod 601 can be used as the working element protruding in the first joint tube 1. When the hard steel rod 601 is used as the working element to control the protraction/retraction and the positioning of the two joint tubes, the movable assembly 4 not only can be controlled via upward-pull way, but also can be controlled via downward-push way. When the movable assembly 4 is pressed downwards, the upper bevel 410 will push sideward the upper bevel 510 of the click button 5 so that the click button 5 can be retracted to leave from the click hole 200. In other words, the present invention can apply to upward-pull or downward-push type push mechanisms. More versatile use and wider range of use can thus be achieved.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:
1. A locking system for a retractable draw bar comprising:
   a first joint tube extending longitudinally from a draw handle having a push mechanism and a working element coupled in responsively displaceable manner thereto, said working element extending through said first joint tube, said first joint tube defining a bottom end portion;
   a second joint tube coaxially receiving in retractable manner at least a portion of said first joint tube, said second joint tube having a tube wall portion terminating at a top end portion, said second joint tube having a click hole formed through said tube wall portion adjacent said top end portion;
   a fixed assembly fixedly engaging said bottom end portion of said first joint tube, said fixed assembly defining an allocation tank opposing said click hole of said second joint tube in orientation;

a movable assembly displaceably coupled to said fixed assembly, said movable assembly being connected to said working element for longitudinal displacement responsive thereto relative to said fixed assembly, said movable assembly having an inner wall portion formed about a longitudinally extended guide hole, said inner wall portion having a first wedged guide structure formed therein; and, a click button displaceably disposed in said allocation tank of said fixed assembly for transverse displacement between first and second positions relative to said fixed assembly, said click button including a main portion and a second wedged guide structure protruding therefrom, said click button being biased by a resilient member toward said first position, said click button in said first position passing transversely through said guide hole of said movable assembly to engage said click hole of said second joint tube, said second wedged guide structure in said first position retentively engaging said first wedged guide structure of said movable assembly, said click button in said second position being disengaged from said click hole of said second joint tube;

whereby said movable assembly is displaceable responsive to user manipulation thereof to disengage said second wedged guide structure from said first wedged guide structure to thereby displace said click button from said first position to said second position, said first joint tube being released thereby for longitudinal adjustment relative to said second joint tube.

2. The locking system as recited in claim 1 wherein first wedged guide structure includes a wedged guide groove portion, and said second wedged guide structure includes a wedged guide block portion.

3. The locking system as recited in claim 1 wherein said working element includes a flexible metallic cord.

4. The locking system as recited in claim 1 wherein said working element includes a rigid metallic rod.

5. The locking system as recited in claim 4 wherein said working element is operable to alternatively impart a longitudinally upward and a longitudinally downward force upon said movable assembly.

6. The locking system as recited in claim 1 further comprising a tube bushing coupled to said top end portion of said second joint tube.

7. The locking system as recited in claim 6 wherein said tube bushing has formed respectively on opposed sides thereof a pair of resilient buckling buttons, said second joint tube having formed adjacent said top end portion thereof a pair of buckling holes respectively engaging said resilient buckling buttons.

8. The locking system as recited in claim 6 wherein said fixed assembly has formed respectively on opposing wall surfaces thereof a pair of transversely projecting fasteners, said first joint tube having formed respectively in opposing wall surfaces thereof a pair of positioning holes, each said positioning hole lockingly engaging one said projecting fastener of said fixed assembly.

9. The locking system as recited in claim 8 wherein said fixed assembly is limited in upward longitudinal displacement by the abutting engagement of an upper edge portion thereof with a lower edge portion of said tube bushing.

10. The locking system as recited in claim 1 wherein said first joint tube has formed respectively in opposed wall surfaces thereof adjacent said bottom end portion a pair of through holes, said fixed assembly having formed therein a transversely penetrated through hole aligned with said through holes of said first joint tube, said first joint tube and said fixed assembly being secured one to the other by a pin bar engaging said through holes thereof.

11. The locking system as recited in claim 1 wherein said fixed assembly includes a longitudinally extended guide block protruding transversely therefrom, said guide block slidably engaging said guide hole of said movable assembly for stabilizing the longitudinal displacement of said movable assembly relative to said fixed assembly.

* * * * *